United States Patent
Wirola et al.

(10) Patent No.: US 10,942,245 B2
(45) Date of Patent: Mar. 9, 2021

(54) IDENTIFYING POTENTIALLY MANIPULATED RADIO SIGNALS AND/OR RADIO SIGNAL PARAMETERS BASED ON A FIRST RADIO MAP INFORMATION AND A SECOND RADIO MAP INFORMATION

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/723,721

(22) Filed: Dec. 20, 2019

(65) Prior Publication Data
US 2020/0200856 A1 Jun. 25, 2020

(30) Foreign Application Priority Data
Dec. 20, 2018 (EP) .................................... 18214705

(51) Int. Cl.
 *G01S 5/02* (2010.01)
 *H04W 4/80* (2018.01)
 *H04W 84/12* (2009.01)

(52) U.S. Cl.
 CPC .......... *G01S 5/0236* (2013.01); *G01S 5/0257* (2013.01); *G01S 5/0284* (2013.01); *H04W 4/80* (2018.02); *H04W 84/12* (2013.01)

(58) Field of Classification Search
 CPC .... G01S 5/0236; G01S 5/0257; G01S 5/0284; H04W 4/80; H04W 84/12
(Continued)

(56) References Cited

U.S. PATENT DOCUMENTS 6,448,925 B1  9/2002  Shridhara
7,716,740 B2  5/2010  Robert et al.
(Continued)

FOREIGN PATENT DOCUMENTS

CN  106597363 A  4/2017
EP  2 746 813 A1  6/2014
(Continued)

OTHER PUBLICATIONS

Extended European Search Report for Application No. EP 18 21 4716 dated Jul. 5, 2019, 6 pages.
(Continued)

*Primary Examiner* — Mong-Thuy T Tran
(74) *Attorney, Agent, or Firm* — Alston & Bird LLP

(57) ABSTRACT

A method is disclosed that includes obtaining one or more first radio signal parameters of one or more first radio signals and one or more second radio signals observed by a mobile device at an observation position. The one or more first and second radio signals are radio signals of first and second radio signal types, respectively. The method also includes obtaining first and second radio map information representing first and second radio maps, respectively, for estimating a position of said mobile device based on observable radio signals of the first and second radio signal types, respectively. The method further includes determining first and second position estimates for the observation position of the mobile device at least partially based on the one or more first and second radio signal parameters and the first and second radio map information, respectively. A corresponding apparatus and computer-readable storage medium are also disclosed.

20 Claims, 4 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 7,970,894 | B1 | 6/2011 | Patwardhan |
| 8,571,578 | B1 | 10/2013 | Chen et al. |
| 8,655,312 | B2 | 2/2014 | Stahlberg et al. |
| 8,750,267 | B2 | 6/2014 | Aggarwal et al. |
| 8,805,403 | B2 | 8/2014 | Curticapean et al. |
| 9,113,291 | B2 | 8/2015 | Venkatraman et al. |
| 9,167,386 | B2 | 10/2015 | Valaee et al. |
| 9,258,713 | B2 | 2/2016 | Rangrajan et al. |
| 9,301,100 | B1 | 3/2016 | Jampani et al. |
| 9,374,709 | B2 | 6/2016 | Peirce et al. |
| 9,420,430 | B2 | 8/2016 | Wuoti et al. |
| 9,466,881 | B1 | 10/2016 | Berry et al. |
| 9,503,864 | B1 | 11/2016 | Chao et al. |
| 9,544,798 | B1 | 1/2017 | Ahmadzadeh et al. |
| 9,794,753 | B1* | 10/2017 | Stitt ................ H04W 4/023 |
| 9,849,978 | B1 | 12/2017 | Carmack et al. |
| 9,867,039 | B2 | 1/2018 | Wang et al. |
| 9,886,850 | B2 | 2/2018 | Benhammou |
| 10,149,159 | B1 | 12/2018 | Perfitt |
| 10,531,423 | B1* | 1/2020 | Hassan ................ H04W 4/02 |
| 2006/0240840 | A1 | 10/2006 | Morgan et al. |
| 2007/0049323 | A1 | 3/2007 | Wang et al. |
| 2009/0088132 | A1 | 4/2009 | Politowicz |
| 2010/0120422 | A1 | 5/2010 | Cheung et al. |
| 2011/0009132 | A1* | 1/2011 | Skarby ................ G01S 5/0263 455/456.5 |
| 2011/0065450 | A1 | 3/2011 | Kazmi |
| 2011/0131651 | A1 | 6/2011 | Shanmugavadivel et al. |
| 2012/0056785 | A1 | 3/2012 | Jovicic et al. |
| 2013/0170378 | A1 | 7/2013 | Ray et al. |
| 2013/0196684 | A1 | 8/2013 | Dong |
| 2013/0252631 | A1* | 9/2013 | Alizadeh-Shabdiz ............ H04W 4/025 455/456.1 |
| 2013/0303185 | A1 | 11/2013 | Kim et al. |
| 2013/0310066 | A1* | 11/2013 | Shu ................ G01S 5/10 455/456.1 |
| 2013/0310068 | A1 | 11/2013 | Fischer et al. |
| 2013/0336138 | A1 | 12/2013 | Venkatraman et al. |
| 2014/0150049 | A1 | 5/2014 | Kwon et al. |
| 2014/0256348 | A1* | 9/2014 | Wirola ................ H04W 64/00 455/456.1 |
| 2015/0065166 | A1 | 3/2015 | Ward et al. |
| 2015/0215762 | A1 | 7/2015 | Edge |
| 2015/0247916 | A1* | 9/2015 | Bartov ................ H04W 56/001 455/456.6 |
| 2015/0351017 | A1 | 12/2015 | Wirola et al. |
| 2016/0054427 | A1* | 2/2016 | Wirola ................ G01S 5/0252 342/451 |
| 2016/0066154 | A1 | 3/2016 | Shin |
| 2016/0094947 | A1 | 3/2016 | Shen et al. |
| 2016/0192136 | A1 | 6/2016 | Pan et al. |
| 2016/0260059 | A1 | 9/2016 | Benjamin et al. |
| 2017/0068902 | A1 | 3/2017 | Kirshner |
| 2017/0078851 | A1 | 3/2017 | Agrawal et al. |
| 2017/0160375 | A1* | 6/2017 | Syrjarinne ............ G01S 5/0252 |
| 2017/0311165 | A1 | 10/2017 | Kang et al. |
| 2017/0325070 | A1* | 11/2017 | Wirola ................ H04W 4/029 |
| 2017/0343640 | A1* | 11/2017 | Khan ................ G01S 5/0252 |
| 2018/0007067 | A1 | 1/2018 | Kaushik |
| 2018/0067187 | A1 | 3/2018 | Oh et al. |
| 2018/0070239 | A1 | 3/2018 | Norrman et al. |
| 2018/0113189 | A1 | 4/2018 | Khan et al. |
| 2018/0123708 | A1 | 5/2018 | Khalajmehrabadi et al. |
| 2018/0188348 | A1 | 7/2018 | Wirola et al. |
| 2018/0219869 | A1 | 8/2018 | Kumar et al. |
| 2018/0255430 | A1 | 9/2018 | Ivanov et al. |
| 2018/0279067 | A1 | 9/2018 | Ivanov et al. |
| 2018/0352585 | A1* | 12/2018 | Yang ................ H04W 4/30 |
| 2019/0150001 | A1 | 5/2019 | Jen et al. |
| 2019/0174452 | A1 | 6/2019 | Lev et al. |
| 2020/0015096 | A1 | 1/2020 | Wirola et al. |
| 2020/0112570 | A1 | 4/2020 | Yang et al. |
| 2020/0200857 | A1 | 6/2020 | Wirola et al. |
| 2020/0200858 | A1 | 6/2020 | Wirola et al. |
| 2020/0200859 | A1 | 6/2020 | Wirola et al. |
| 2020/0200864 | A1 | 6/2020 | Wirola et al. |
| 2020/0200865 | A1 | 6/2020 | Wirola et al. |
| 2020/0204988 | A1 | 6/2020 | Wirola et al. |
| 2020/0205004 | A1 | 6/2020 | Wirola et al. |
| 2020/0205005 | A1 | 6/2020 | Wirola et al. |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Extended European Search Report for Application No. EP 18 21 4721 dated Jul. 22, 2019, 7 pages.
Extended European Search Report for Application No. EP 18 21 4705 dated Jul. 5, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/721,311, filed Dec. 19, 2019; In re: Wirola et al. entitled *Enabling Flexible Provision of Signature Data of Position Data Representing an Estimated Position*.
U.S. Appl. No. 16/723,451, filed Dec. 20, 2019; In re: Wirola et al. entitled *Service for Real-Time Spoofing/Jamming/Meaconing Warning*.
U.S. Appl. No. 16/723,572, filed Dec. 20, 2019; In re: Wirola et al. entitled *Statistical Analysis of Mismatches for Spoofing Detection*.
U.S. Appl. No. 16/723,620, filed Dec. 20, 2019; In re: Wirola et al. entitled *Crowd-Sourcing of Potentially Manipulated Radio Signals and/or Radio Signal Parameters*.
U.S. Appl. No. 16/723,662, filed Dec. 20, 2019; In re: Wirola et al. entitled *Device-Centric Learning of Manipulated Positioning*.
U.S. Appl. No. 16/723,768, filed Dec. 20, 2019; In re: Wirola et al. entitled *Identifying Potentially Manipulated Radio Signals and/or Radio Signal Parameters Based on Radio Map Information*.
U.S. Appl. No. 16/723,802, filed Dec. 20, 2019; In re: Wirola et al. entitled *identifying Potentially Manipulated Radio Signals and/or Radio Signal Parameters*.
GPS Spoofing A Growing Problem For Uber [online] [retrieved Feb. 17, 2020], Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https://www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystore system | Android Developers [online] [retrieved Feb. 17, 2020]. Retrieved via the Internet: https://web.archive.org/web/20181212204557/https://developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/

(56) References Cited

OTHER PUBLICATIONS

20170923l6223/https://fi.wikipedia.org/wiki/Subscriber_Identity_Module (dated Sep. 23, 2017) 2 pages.
Extensible Authentication Protocol—Wikipedia [online] [retrieved Feb. 17, 2020], Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3rd Generation Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.
Enterprise Mobility 8.1 Design Guide—WLAN RF Design Consideration [Cisco 5500 Series Wireless controllers]—Cisco [online] [retrieved Feb. 25, 2020]. Retrieved via the Internet: https://web.archive.org/web/20170801042321/https://www.cisco/com/c/en/us/td/docs/wireless/Controller/8-1/Enterprise-Mobility-8-1-Design-Guide/Enterprise_Mobility_8-1_Deployment_Guide/wlanrf.html (dated Aug. 1, 2017) 46 pages.
Office Action for U.S. Appl. No. 16/723,802, dated May 18, 2020.
Office Action for U.S. Appl. No. 16/723,662 dated Jul. 9, 2020.
Office Action for U.S. Appl. No. 16/723,572 dated Jul. 7, 2020.
Extended European Search Report for Application No. EP 18214714.0 dated Jul. 5, 2019, 6 pages.
Final Office Action for U.S. Appl. No. 16/723,802 dated Sep. 2, 2020, 18 pages.
Notice of Allowance for U.S. Appl. No. 16/723,802 dated Nov. 6, 2020.
Non-Final Office Action for U.S. Appl. No. 16/723,451 dated Nov. 23, 2020.
Final Office Action for U.S. Appl. No. 16/723,662 dated Dec. 18, 2020.
Final Office Action for U.S. Appl. No. 16/723,572 dated Dec. 8, 2020.

\* cited by examiner

IDENTIFYING POTENTIALLY MANIPULATED RADIO SIGNALS AND/OR RADIO SIGNAL PARAMETERS BASED ON A FIRST RADIO MAP INFORMATION AND A SECOND RADIO MAP INFORMATION

CROSS-REFERENCE TO RELATED APPLICATIONS

This application claims priority to European Application No. 18214705.8, filed Dec. 20, 2018, the entire contents of which are incorporated herein by reference.

FIELD OF THE DISCLOSURE

The invention relates to the field of non-GNSS based radio positioning and more specifically to identifying potentially manipulated radio signals and/or radio signal parameters based on radio map information.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems. Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EMBODIMENTS OF THE INVENTION

Non GNSS-based radio positioning systems (e.g. Bluetooth, WLAN and cellular based radio positioning systems) as disclosed above may be affected by manipulating radio signals that are used for positioning purposes during the positioning stage. Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic radio signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.

Jamming of radio signals may be considered to relate a deliberate attempt to disrupt detecting one or more radio signals by a mobile device, for example by transmitting radio signals and/or radio noise interfering the one or more radio signals.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

According to an exemplary aspect of the invention, a method is disclosed, wherein the method comprises:

obtaining one or more first radio signal parameters of one or more first radio signals observed by a mobile device at an observation position and one or more second radio signal parameters of one or more second radio signals observed by the mobile device at the observation position, wherein the one or more first radio signals are radio signals of a first radio signal type and the one or more second radio signals are radio signals of a second radio signal type;

obtaining or holding available first radio map information representing a first radio map for estimating a position of the mobile device based on observable radio signals of the first radio signal type and second radio map information representing a second radio map for estimating a position of the mobile device based on observable radio signals of the second radio signal type;

determining a first position estimate for the observation position of the mobile device at least partially based on the one or more first radio signal parameters and the first radio map information;

determining a second position estimate for the observation position of the mobile device at least partially based on the one or more second radio signal parameters and the second radio map information.

The disclosed method may serve for identifying potentially manipulated radio signals and/or radio signal parameters, for example at least partially based on the first radio map information and the second radio map information.

The mobile device may be an Internet-of-Thing (IoT) device, a smart home device, a smartphone, a tablet computer, a notebook computer, a smart watch and a smart band.

The disclosed method may be performed by at least one apparatus (e.g. any one embodiment of the apparatus(es) disclosed below). For example, the disclosed method may be performed by the mobile device or by a remote device (i.e. a device different from or remote to the mobile device) like a server (e.g. a positioning server). Alternatively, the mobile device and the remote device may for example cooperate to perform the disclosed method.

For example, the disclosed method may be part of a non-GNSS based radio positioning system as disclosed above. The mobile device may be enabled for or support such a non-GNSS based radio positioning system. This may be understood to mean that the mobile device is configured to determine (e.g. estimate) or to cause determining (e.g. estimating) its position (e.g. a position estimate) at least partially based on the first radio signal parameter(s) of the one or more first radio signals and the second radio signal parameter(s) of the one or more second radio signals obtained at this position (e.g. obtained as a scanning result of scanning for observable radio signals at this position), wherein the one or more first radio signal are radio signals of the first radio signal type and the one or more second radio signals are radio signals of the second radio signal type. Determining (e.g. estimating) position estimate of the mobile device at least partially based on the first radio signal parameter(s) and the second radio signal parameter(s) may be understood to mean that the determining (e.g. estimating) is performed as a function of the first radio signal parameter(s) and the second radio signal parameter(s).

The one or more first radio signals are radio signals of the first radio signal type and the one or more second radio signals are radio signals of the second radio signal type. For example, a radio type may be characterized by the underlying radio technology. The term radio technology refers to any technology using radio waves for wireless communication. For example, a radio technology may be characterized by its field of application, communication range, downstream, upstream speed and/or the equipment and methods used for transmitting and receiving radio waves. For example, the characteristics of a radio technology may follow a communication standard. The underlying radio technology of a radio signal may be understood to be the radio technology according to which the respective radio signal may be transmitted and/or received. Examples of a radio technology are a Bluetooth radio technology, a Bluetooth Low Energy (BLE) radio technology, a WLAN radio technology, a LPWAN radio technology or a cellular radio technology. The Bluetooth standards are specified by the Bluetooth Special Interest Group and are presently available under www.bluetooth.com. A cellular radio technology may for example be a 2G/3G/4G/5G cellular communication technology. The 2G/3G/4G/5G standards are developed by the 3GPP and presently available under www.3gpp.org. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org. WLAN is for example specified by the standards of the IEEE 802.11 family (www.ieee.org).

As another alternative or additional example, a radio signal type may be characterized by a frequency or a frequency band. When a radio signal is of a radio signal type characterized by a frequency, it is understood to mean that this radio signal may be transmitted and/or received at this frequency. A frequency band is an interval in the frequency domain, delimited by a lower frequency and an upper frequency. When a radio signal is of a radio signal type characterized by a frequency band, it is understood to mean that the radio signal may be transmitted and/or received at any frequency included in the frequency band. Examples of different frequency bands are ISM bands (e.g. from 433 to 434 MHz (e.g. used by LPWAN) or from 2.4 to 2.5 GHz (e.g. used by WLAN and Bluetooth) or from 5.725 to 5.875 GHz (e.g. used by WLAN)), SRD bands (e.g. from 863 to 870 MHz (e.g. used by LPWAN)) 2G bands (e.g. from 824 to 894 MHz or from 870 to 960 MHz), 3G bands (e.g. from 1920 to 2170 MHz), 4G bands (e.g. from 1710 to 1880 MHz), to name a few non-limiting examples.

A radio signal parameter of a certain radio signal may for example be obtained by the mobile device as a scanning result when scanning for observable radio signals at a certain position (e.g. for determining a position estimate of its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information (e.g. an identifier) contained in the radio signal, (2) a representation (e.g. an indicator or a value) of a physical quantity (e.g. a received signal strengths) of the radio signal, and (3) a representation (e.g. an indicator) of the radio signal type of the radio signal. Accordingly, a radio signal parameter may be determined by at least one of (1) extracting information contained in the radio signal, (2) measuring a physical quantity (e.g. a received signal strength) of the radio signal and (3) determining a radio signal type of the radio signal.

For example, the mobile device may scan for observable radio signals at an observation position, for example for determining a position estimate of its position (e.g. based on a non-GNSS based radio positioning system as disclosed above). The one or more first radio signal parameters and the one or more second radio signal parameters may then be obtained as scanning result. As disclosed above, a spoofing malware running on the mobile device may falsify such scanning result.

The one or more first radio signal parameters and the one or more second radio signal parameters may be understood to be authentic radio signal parameters (e.g. determined by the mobile device when scanning for observable radio signals at the observation position) as well as manipulated (e.g. falsified or spoofed) radio signal parameters (e.g. falsified or generated by a spoofing malware running on the mobile device). Moreover, it is to be understood that at least some of the radio signals observed by the mobile device when scanning for observable radio signals at the observation position may be manipulated (e.g. falsified or spoofed) radio signals. For example, while the one or more first radio signals may be authentic radio signals, at least one of the one or more second radio signals may be manipulated radio signals, or vice versa.

Obtaining the first radio map information and the second radio map information may be understood to mean that the first radio map information and the second radio map information are for example received (e.g. by an apparatus performing the disclosed method like the mobile device) from a remote device (e.g. the positioning server). Alternatively or additionally, the first radio map information and the second radio map information may be held available (e.g. by an apparatus performing the disclosed method like the mobile device or the positioning server), for example by storing the first radio map information and the second radio map information in memory means. Since such memory means are typically limited in size, it may be advantageous to hold only a part of the first radio map information and the second radio map information available, for example if it is known that these particular parts of the first radio information and the second radio map information are frequently used (e.g. for positioning purposes). For example, the first radio map information and the second radio map information is partially obtained and partially held available by the mobile device.

As disclosed above, the first radio map information represents the first radio map for estimating the position of the mobile device based on observable radio signals of the first radio signal type and the second radio map information represents the second radio map for estimating a position of the mobile device based on observable radio signals of the second radio signal type. For example, the first radio map may be a radio map for estimating the position of the mobile device based on observable radio signals of the first radio signal type if radio signals of the first radio signal type are observable in a predetermined environment of the first radio map. Likewise, the second radio map may be a radio map for estimating the position of the mobile device based on observable radio signals of the second radio signal type if radio signals of the second radio signal type are observable in a predetermined environment of the second radio map.

The predetermined environment of a radio map may for example be understood to be the area covered by the radio map. Examples of such a predetermined environment are a building and/or a complex of buildings (e.g. a shopping center, a parking garage, an airport, a company site, etc.). The area corresponding to the predetermined environment of the first radio map may be identical to the area corresponding to the second predetermined environment of the second radio map. Alternatively, the area corresponding to the predetermined environment of the first radio map and the area corresponding to the predetermined environment of the second radio map may (e.g. at least or only) partially overlap.

For example, a radio map may be indicative of a respective expected radio environment for each of a plurality of positions (e.g. for any position or for each position of a grid of positions) within the predetermined environment of the radio map. Therein, an expected radio environment at a certain position may be indicative of one or more radio signals or one or more radio signal parameters of one or more radio signals that are expected to be observable (e.g. obtainable as scanning results) at this position. For example, the first radio map may be indicative of a respective radio environment for each of a plurality of positions within the predetermined environment of the first radio map. Therein, the respective radio environment at a certain position may be indicative of one or more radio signals or one or more radio signal parameters of one or more radio signals of the first signal type that are expected to be observable at this position. Likewise, the second radio map may be indicative of a respective radio environment for each of a plurality of positions within the predetermined environment of the second radio map. Therein, the respective radio environment at a certain position may be indicative of one or more radio signals or one or more radio signal parameters of one or more radio signals of the second signal type that are expected to be observable at this position.

To this end, a radio map may contain or represent a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building. A respective radio model for a respective radio device of the plurality of radio devices may be understood to represent at least the expected radio coverage of the respective radio device (e.g. on a certain floor of a building). For example, the radio model of such a radio device may describe the coverage area (e.g. on a certain floor of a building) within which radio signals transmitted or triggered to be transmitted by this radio device are expected to be observable. An example for such a radio model is a radio image representing an expected radio signal strength field of the radio signals transmitted or triggered to be transmitted by this radio device. The real radio coverage of such a radio device may however deviate from the expected radio coverage as described by such a radio model. As disclosed above, the radio map may be determined by the positioning server during the training stage of the non-GNSS based radio positioning system.

For example, the first radio map may contain or represent a respective radio model for a plurality of radio devices transmitting (e.g. broadcasting) radio signals of the first radio signal type that are observable within the area covered by the first radio map. Likewise, the second radio map may contain or represent a respective radio model for a plurality of radio devices transmitting (e.g. broadcasting) radio signals of the second radio signal type that are observable within the area covered by the second radio map.

Determining the first position estimate for the observation position of the mobile device at least partially based on the one or more first radio signal parameters and the first radio map information is understood to mean that determining the first position estimate may depend on the one or more first radio signal parameters and the first radio map information. The determining may be performed according to a predetermined algorithm (e.g. a positioning algorithm). The predetermined algorithm (e.g. a positioning algorithm) may for example comprise the step of determining whether the one or more first radio signal parameters match the expected radio environment indicated by the first radio map, which is represented by the first radio map information, at a position of the predetermined environment of the first radio map. For example, if it is determined that the one or more first radio signal parameters match the expected radio environment indicated by the first radio map represented by the first radio map information at a certain position, this position may be considered as the first position estimate. It is to be understood that determining a first position estimate for the observation position of the mobile device determining may optionally depend on further information (e.g. further radio signal parameters, sensor information, etc.). For example, the determining may be at least a function of the one or more radio first signal parameters and the first radio map information and, optionally, of further information.

Like determining the first position estimate for the observation position of the mobile device, determining the second position estimate for the observation position of the mobile device at least partially based on the one or more second radio signal parameters and the second radio map information is understood to mean that determining the second position estimate may depend on the one or more second radio signal parameters and the second radio map information. The determining may be performed according to a predetermined algorithm (e.g. a positioning algorithm). The predetermined algorithm (e.g. a positioning algorithm) may for example comprise the step of determining whether the one or more second radio signal parameters match the expected radio environment indicated by the second radio map, which is represented by the second radio map information, at a position of the predetermined environment of the second radio map. For example, if it is determined that the one or more second radio signal parameters match the expected radio environment indicated by the second radio map represented by the second radio map information at a certain position, this position may be considered as the second position estimate. It is to be understood that determining a second position estimate for the observation position of the mobile device determining may optionally depend on further information (e.g. further radio signal parameters, sensor information, etc.). For example, the determining may be at least a function of the one or more radio second signal parameters and the second radio map information and, optionally, of further information.

For example, the first position estimate and the second position estimate are represented by a respective first position estimate information and a respective second position estimate information. The first position estimate information may represent or comprise coordinates representing the first position estimate and the second position estimate information may represent or comprise coordinates representing the second position estimate. For example the first position estimate information and the second position estimate information may additionally represent or comprise respective uncertainty information on the position uncertainty of the position estimate.

If spoofing occurs, for example by transmitting (e.g. broadcasting) one or more manipulated (e.g. falsified) radio signals or by retransmitting (e.g. rebroadcasting) authentic radio signals captured at a different position and/or time using a radio spoofing device, it may for example be less likely that both the one or more first radio signals, which are radio signals of the first radio signal type, and the one or more second radio signals, which are radio signals of the second radio signal type may be manipulated (e.g. falsified). A possible reason for this could be for example the first radio signal type being more susceptible to spoofing attacks than the second radio signal type. As another possible reason for this, it could be very difficult for an attacker to manipulate (e.g. falsify) both the one or more first radio signals of the first radio signal type and the one or more second radio signals of the second radio signal type at the same time. For example, the one or more first radio signals may be manipulated (e.g. falsified), while the one or more second radio signals may be authentic. According to the claimed method, the first position estimate determined for the observation position of the mobile device at least partially based on the one or more first radio signal parameters of the one or more manipulated (e.g. falsified) first radio signals most likely does not match the second position estimate determined for the observation position of the mobile device at least partially based on the one or more second radio signal parameters of the one or more authentic second radio signals.

For example based on such mismatches, the disclosed method allows for identifying potentially manipulated radio signals and/or radio signal parameters at least partially based on the first and the second radio map information and, thus, to mitigate threats associated with manipulation techniques like spoofing and jamming.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) mobile device(s), for example (a) chip(s) or chipset(s). Alternatively, the disclosed apparatus(es) may be (a) mobile device(s). The mobile device may be configured for determining its position based on a non-GNSS based radio positioning system as disclosed above, for example a Bluetooth, WLAN or cellular based radio positioning system or a combination thereof.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a positioning system is disclosed which comprises at least one of the disclosed apparatus(es) like a mobile device and/or a positioning server. Optionally, the system may further comprise one or more radio devices transmitting (e.g. broadcasting) the one or more radio signals.

As disclosed above, the mobile device may be an Internet-of-Thing (IoT) device, a smart home device, a smartphone, a tablet computer, a notebook computer, a smart watch and a smart band.

As disclosed above, the positioning server may be configured to receive a plurality of radio fingerprint observation reports during the training stage and to determine a radio map for a predetermined environment at least partially based on the plurality of radio fingerprint observation reports. The positioning server may be further configured to provide the radio map information representing a radio map to the at least one apparatus (e.g. the mobile device) to enable the apparatus to estimate (e.g. determine) its position based on radio signals observed at a certain position of the apparatus if the apparatus is located within the predetermined environment.

The positioning server may be part of a plurality of servers (e.g. forming a positioning cloud) or may be represented by such a plurality of servers (e.g. forming a positioning cloud).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for identifying potentially manipulated radio signals and/or radio signal parameters at least partially based on radio map information.

In the following, further features and embodiments of these exemplary aspects of the invention will be described.

According to an exemplary embodiment of the invention, the method further comprises:
scanning for radio signals (e.g. the one or more first radio signals and/or the one or more second radio signals) at the observation position, wherein one or more first radio signal parameters and/or the one or more second radio signal parameters are obtained as a result of the scanning at the observation position.

According to an exemplary embodiment of the invention, the method further comprises:
determining whether the first position estimate for the observation position of the mobile device matches the second position estimate for the observation position of the mobile device.

For example, the determining whether the first position estimate for the observation position of the mobile device matches the second position estimate for the observation position of the mobile device may be performed according to predetermined rules, such as a predetermined algorithm (e.g. a matching algorithm or a comparing algorithm). The predetermined algorithm (e.g. a matching algorithm or a comparing algorithm) may for example comprise the step of determining whether coordinates representing the first position estimate match coordinates representing the first position estimate. Accordingly, if coordinates representing the first position estimate match coordinates representing the first position estimate, it may be determined that first position estimate matches the second position estimate. For example, the predetermined algorithm (e.g. a matching algorithm or a comparing algorithm) may be configured to reduce the effect of inaccuracies like position uncertainties, for example by determining that there is a match even if the coordinates representing the first position estimate and the coordinates representing the second position estimate are not equal, but for example substantially equal or within a (e.g. predetermined) distance to each other. Therein, the predetermined algorithm (e.g. a matching algorithm or a comparing algorithm) may for example consider respective uncertainty information on the position uncertainty of the first position estimate information and/or the second position estimate information. For example, whenever it does not follow from the predetermined rules such as a predetermined algorithm (e.g. a matching algorithm or a comparing algorithm) for determining whether the first position estimate matches the second position estimate that the first position estimate matches the second position estimate, it may be determined that the first position estimate does not match the second position estimate.

According to an exemplary embodiment of the invention, the method further comprises one or more of the following, if it is determined that the first position estimate for the position of the mobile device matches the second position estimate for the position of the mobile device:
identifying or causing of identifying at least one of the first radio map information and the second radio map information as trustworthy;
identifying or causing of identifying at least one of the first position estimate and the second position estimate as trustworthy;
identifying or causing of identifying at least one of the first radio signal type and the second radio signal type as trustworthy;
determining a qualified position estimate for the position of the mobile device at least partially based on the first position estimate and the second position estimate.

For example, if the first position estimate determined based on the one or more first radio signal parameters of the one or more first radio signals and the first radio map information matches the second position estimate determined based on the one or more second radio signal parameters of the one or more second radio signals and the second radio map information matches, it may be likely that both the one or more first radio signals and the one or more second radio signals are authentic and, thus, they may be considered to be trustworthy. Moreover, this may be considered to confirm that there is presently no spoofing radio device transmitting radio signals of the first or second radio signal type and that the first radio map and the second radio map are up to date and, thus, they may be considered to be trustworthy as well. Accordingly, at least one (e.g. preferably all) of the first radio map information, the second radio map information, the first position estimate, the second position estimate, the first radio signal type and the second radio signal type may be identified as trustworthy in this scenario. Additionally or alternatively, the one or more first radio signals (and/or the one or more first radio signal parameters) and the one or more second radio signals (and/or the one or more second radio signal parameters) may be identified as trustworthy in this scenario.

Identifying at least one of the first radio map information and the second radio map information as trustworthy may be understood to mean that trust information identifying at least one of the first radio map information and the second radio map information as trustworthy are stored by the apparatus performing the disclosed method (e.g. the mobile device or a remote device like the positioning server). For example, the trust information may be stored together or may be part of respective first radio map information and/or second radio map information. Causing of identifying at least one of the first radio map information and the second radio map information as trustworthy may be understood to mean that trust information are provided (e.g. to the mobile device or to a remote device like the positioning server) causing the device receiving the trust information to identify at least one of the first radio map information and the second radio map information as trustworthy.

By identifying at least one of the first radio map information and the second radio map information as trustworthy, the trustworthiness can be considered when determining a further position estimate (e.g. after determining the first position estimate and the second position estimate) at least partially based on at least one of the first radio map information and the second radio map information. For example, for business services or applications which rely on trustworthy positioning like car sharing services, only position estimates determined at least partially based on radio map information identified as trustworthy may be considered. Other business services or applications may however consider position estimates determined at least partially based on radio map information even if the radio map information is not considered as trustworthy (e.g. potentially manipulated).

Identifying at least one of the first position estimate and the second position estimate as trustworthy may be understood to mean that trust information identifying at least one of the first position estimate and the second position estimate as trustworthy are stored by the apparatus performing the disclosed method (e.g. the mobile device or a remote device like the positioning server). For example, the trust information may be stored together or may be part of a respective first position estimate information and/or a respective second position estimate information. Causing of identifying at least one of the first position estimate and the second position estimate as trustworthy may be understood to mean that trust information is provided (e.g. to the mobile device or to a remote device like the positioning server) causing the device receiving the trust information to identify at least one of the first position estimate and the second position estimate as trustworthy.

By identifying at least one of the first position estimate and the second position estimate as trustworthy, the trustworthiness can be considered when further processing at least one of the first position estimate and the second position estimate. For example, business services or applications which rely on trustworthy positioning like car sharing services may only use position estimates identified as trustworthy. Other business services or applications may however consider position estimates even if they are not considered as trustworthy (e.g. potentially manipulated).

Identifying at least one of the first radio signal type and the second radio signal type as trustworthy may be understood to mean that trust information identifying at least one of the first radio signal type and the second radio signal type as trustworthy are stored by the apparatus performing the disclosed method (e.g. the mobile device or a remote device like the positioning server). Causing of identifying at least one of the first radio signal type and the second radio signal type as trustworthy may be understood to mean that trust information is provided (e.g. to the mobile device or to a remote device like the positioning server) causing the device receiving the trust information to identify at least one of the first radio signal type and the second radio signal type as trustworthy.

By identifying at least one of the first radio signal type and the second radio signal type as trustworthy, the trustworthiness can be considered when processing further radio signal parameters of one or more further radio signals of at least one of the first radio signal type and the second radio signal type. For example, business services or applications which rely on trustworthy positioning like car sharing services may only use radio signal parameters of radio signals of radio signal types identified as trustworthy. Other business services or applications may however consider radio signal types even if they are not considered as trustworthy (e.g. potentially manipulated).

Determining a qualified position estimate for the position of the mobile device at least partially based on the first position estimate and the second position estimate may be understood to mean that the qualified position estimate for the position of the mobile device may depend on the first position estimate and the second position estimate. For example, if the first position estimate and the second position estimate are equal (e.g. if they are represented by the same coordinates), the qualified position estimate may be determined to be equal to the first position estimate and the second position estimate. However, if the first position estimate and the second position estimate are not equal, the qualified position estimate may be determined according to predetermined rules, such as a predetermined algorithm. In this case, determining the qualified position estimate may for example consider the distance between the first position estimate and the second position estimate and, further exemplary, other information like uncertainty information. Thereby, in the example of none of the one or more first radio signals and the one or more second radio signals being manipulated (e.g. falsified), the disclosed method may allow for decreasing or minimizing the position uncertainty of the final position estimate for the observation position of the mobile device, because the determining the qualified position estimate serving as final position estimate is at least partially based on the first position estimate and the second position.

According to an exemplary embodiment of the invention, the method further comprises one or more of the following, if it is determined that the first position estimate for the observation position of the mobile device does not match the second position estimate for the observation position of the mobile device:
- identifying or causing of identifying at least one of the first radio map information and the second radio map information as potentially manipulated or outdated;
- identifying or causing of identifying at least one of the first position estimate and the second position estimate as potentially manipulated;
- identifying or causing of identifying at least one of the first radio signal type and the second radio signal type as potentially manipulated;
- excluding at least one of the first position estimate and the second position estimate from determining a qualified position estimate for the position of the mobile device;
- determining whether at least one of the first position estimate and the second position estimate is potentially manipulated.

For example, if the first position estimate determined based on the one or more first radio signal parameters of the one or more first radio signals and the first radio map information does not match the second position estimate determined based on the one or more second radio signal parameters of the one or more second radio signals and the second radio map information matches, it may be likely that at least one of the one or more first radio signals and the one or more second radio signals are manipulated (e.g. falsified). Alternatively or additionally, this may be considered to indicate that the first radio map information and/or the second radio map information are not up to date (e.g. outdated). Accordingly, at least one (e.g. preferably all) of the first radio map information, the second radio map information, the first position estimate, the second position estimate as well as the first radio signal type and the second radio signal type may be identified as potentially manipulated or outdated in this scenario. Additionally or alternatively, the one or more first radio signals (and/or the one or more first radio signal parameters) and the one or more second radio signals (and/or the one or more second radio signal parameters) may be identified as potentially manipulated in this scenario.

As another example, if it is determined that the first position estimate for the observation position of the mobile device does not match the second position estimate for the observation position of the mobile device, it may be the case that for example the first radio signal type is more susceptible to spoofing attacks than the second radio signal type. In this scenario, for example only the first radio map information, the first position estimate and/or the first radio signal type may be identified as potentially manipulated. Additionally or alternatively, the one or more first radio signals (and/or the one or more first radio signal parameters) may be identified as potentially manipulated.

Identifying at least one of the first radio map information and the second radio map information as potentially manipulated or outdated may be understood to mean that manipulation or version information identifying at least one of the first radio map information and the second radio map information as potentially manipulated or outdated are stored by the apparatus performing the disclosed method (e.g. the mobile device or a remote device like the positioning server). For example, the manipulation information or version information may be stored together or may be part of respective first radio map information and/or second radio map information. Causing of identifying at least one of the first radio map information and the second radio map information as potentially manipulated or outdated may be understood to mean that manipulation information or version information are provided (e.g. to the mobile device or to a remote device like the positioning server) causing the device receiving the manipulation information or version information to identify at least one of the first radio map information and the second radio map information as potentially manipulated or outdated.

By identifying at least one of the first radio map information and the second radio map information as potentially manipulated or outdated, the potential manipulation or obsolescence can be considered when determining a further position estimate (e.g. after determining the first position estimate and the second position estimate) at least partially based on at least one of the first radio map information and the second radio map information. As disclosed above, for business services or applications which rely on trustworthy positioning like car sharing services, only position estimates determined at least partially based on radio map information identified as trustworthy may be considered. Other business services or applications may however consider position estimates determined at least partially based on radio map information even if the radio map information is identified as potentially manipulated or outdated.

Identifying at least one of the first position estimate and the second position estimate as potentially manipulated may be understood to mean that manipulation information identifying at least one of the first position estimate and the second position estimate as potentially manipulated are stored by the apparatus performing the disclosed method (e.g. the mobile device or a remote device like the positioning server). For example, the manipulation information may be stored together or may be part of a respective first position estimate information and/or a respective second position estimate information. Causing of identifying at least one of the first position estimate and the second position estimate as potentially manipulated may be understood to mean that manipulation information is provided (e.g. to the mobile device or to a remote device like the positioning server) causing the device receiving the manipulation information to identify at least one of the first position estimate and the second position estimate as potentially manipulated.

By identifying at least one of the first position estimate and the second position estimate as potentially manipulated, the potential manipulation can be considered when further processing at least one of the first position estimate and the second position estimate. For example, business services or applications which rely on trustworthy positioning like car sharing services may not use position estimates identified as potentially manipulated. Other business services or applications may however consider position estimates identified as potentially manipulated.

Identifying at least one of the first radio signal type and the second radio signal type as potentially manipulated may be understood to mean that manipulation information identifying at least one of the first radio signal type and the second radio signal type as potentially manipulated are stored by the apparatus performing the disclosed method (e.g. the mobile device or a remote device like the positioning server). Causing of identifying at least one of the first radio signal type and the second radio signal type as potentially manipulated may be understood to mean that manipulation information is provided (e.g. to the mobile device or to a remote device like the positioning server) causing the device receiving the manipulation information to identify at least one of the first radio signal type and the second radio signal type as potentially manipulated.

By identifying at least one of the first radio signal type and the second radio signal type as potentially manipulated, the potential manipulation can be considered when processing further radio signal parameters of one or more further radio signals of at least one of the first radio signal type and the second radio signal type. For example, business services or applications which rely on trustworthy positioning like car sharing services may only use radio signal parameters of radio signals of radio signal types identified as trustworthy. Other business services or applications may however consider radio signal types even if they are identified as potentially manipulated.

Excluding at least one of the first position estimate and the second position estimate from determining a qualified position estimate for the position of the mobile device may be understood to mean that the excluded first position estimate and/or the excluded second position estimate is not used for determining a qualified position estimate for the position of the mobile device. In case the excluded first position estimate and/or the excluded second position estimate position is determined by a remote device (e.g. a positioning server), the mobile device may provide manipulation information to the remote device causing the remote device to exclude at least one of the first position estimate and the second position estimate from determining a qualified position estimate for the position of the mobile device. This has the effect that only position estimates which are considered to be trustworthy (i.e. not potentially manipulated) are used for determining a qualified position estimate for the position of the mobile device.

Determining whether at least one of the first position estimate and the second position estimate is potentially manipulated may be understood to mean that it is determined whether the first position estimate, the second position estimate or both are to be identified as potentially manipulated.

For example, it may be determined, for each of the first radio signal parameters and the second radio signal parameters, whether they are expected or unexpected for the respective one of the first position estimate and the second position estimate. The determining may for example consider further information like the respective one of the first radio map information and the second radio map information, previous position estimate information representing a previous position estimate of the mobile device or sensor information (e.g. sensor information indicating a movement of the mobile device from the previous position estimate to the observation position). For example, if the sensor information indicate a first distance between the previous position represented by previous position estimate which is different from a second distance between the positions represented by the previous position estimate and the first position estimate, it may be determined that the first radio signal parameters are unexpected for the first position estimate and, thus, it may be determined that the first position estimate is to be identified as potentially manipulated. Likewise, if the sensor information indicate a first distance between the previous position represented by previous position estimate which is different from a third distance between the positions represented by the previous position estimate and the second position estimate, it may be determined that the second radio signal parameters are unexpected for the second position estimate and, thus, it may be determined that the second position estimate is to be identified as potentially manipulated.

Alternatively or additionally, a user, who may be a user of the apparatus performing the method and/or a user of the mobile device), may determine which of the first position estimate and the second position estimate is to be identified as potentially manipulated after it has been determined that the first position estimate and the second position estimate do not match.

It is however to be understood that the determining whether at least one of the first position estimate and the second position estimate is potentially manipulated is not limited to the above disclosed examples.

According to an exemplary embodiment of the invention, the first position estimate for the observation position of the mobile device contains or represents first floor level information and the second position estimate for the observation position of the mobile device contains or represents second floor level information.

For example, the first position estimate may contain or represent the first floor level information and the second position information may contain or represent the second floor information, if the first position estimate and second position estimate relate to respective positions indoors, e.g. inside a building and/or a complex of buildings (e.g. a shopping center, a parking garage, an airport, a company site, etc.). The first floor level information and the second first floor level information may be considered when determining whether the first position estimate matches the second position estimate. For example, if the first floor level information indicates that the first position estimate relates to a position on the fourth floor of a building and the second floor level information indicates that the second position estimate relates to a position on the fifth floor of the building, it is determined that the first position estimate and the second position estimate do no match.

According to an exemplary embodiment of the invention, the first radio signal type is different from the second radio signal type.

According to an exemplary embodiment of the invention, the one or more first radio signals of the first radio signal type and the one or more second radio signals of the second radio signal type differ at least in an underlying radio technology. As disclosed above, a radio technology may be characterized by its field of application, communication range, downstream, upstream speed and/or the equipment and methods used for transmitting and receiving radio waves. For example, the characteristics of a radio technology may follow a communication standard. The underlying radio technology of a radio signal may be understood to be the radio technology according to which the respective radio signal is transmitted and/or received. Examples of such a radio technology are a Bluetooth radio technology, a Bluetooth Low Energy (BLE) radio technology, a WLAN radio technology, a LPWAN radio technology or a cellular radio technology. The Bluetooth standards are specified by the Bluetooth Special Interest Group and are presently available under www.bluetooth.com. A cellular radio technology may for example be a 2G/3G/4G/5G cellular communication technology. The 2G/3G/4G/5G standards are developed by the 3GPP and presently available under www.3gpp.org. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org. WLAN is for example specified by the standards of the IEEE 802.11 family (www.ieee.org).

For example, the one or more first radio signals of the first radio signal type may be signals of the cellular radio technology and the one or more second radio signals of the second radio signal type may be signals of the WLAN radio technology. In this scenario, the first radio signal type differs from the second radio signal type in the underlying radio technology.

According to an exemplary embodiment of the invention, the one or more first radio signals of the first radio signal type and the one or more second radio signals of the second radio signal type differ at least in a frequency or a frequency band.

As disclosed above, a radio signal type may be characterized by a frequency or a frequency band. When a radio signal is of a radio signal type characterized by a frequency, it is understood to mean that the radio signal may be transmitted and/or received at this frequency. A frequency band is an interval in the frequency domain, delimited by a lower frequency and an upper frequency. When a radio signal is of a radio signal type characterized by a frequency band, it is understood to mean that the radio signal may be transmitted and/or received at any frequency included in the frequency band. Examples of different frequency bands are ISM bands (e.g. from 433 to 434 MHz (e.g. used by LPWAN) or from 2.4 to 2.5 GHz (e.g. used by WLAN and Bluetooth) or from 5.725 to 5.875 GHz (e.g. used by WLAN)), SRD bands (e.g. from 863 to 870 MHz (e.g. used by LPWAN)) 2G bands (e.g. from 824 to 894 MHz or from 870 to 960 MHz), 3G bands (e.g. from 1920 to 2170 MHz), 4G bands (e.g. from 1710 to 1880 MHz), to name a few non-limiting examples.

For example, the one or more first radio signals of the first radio signal type are signals of the WLAN radio technology transmitted at a frequency included in the 2.4 GHz frequency band and the one or more second radio signals of the second radio signal type are signals of the WLAN radio technology technology transmitted at a frequency included in the 5 GHz frequency band. In this scenario, the first radio signal type differs from the second radio signal type at least in frequency and frequency band.

If spoofing occurs, for example by transmitting (e.g. broadcasting) one or more manipulated (e.g. falsified) radio signals or by retransmitting (e.g. rebroadcasting) authentic radio signals captured at a different position and/or time using a radio spoofing device, it may for example be less likely that both the one or more first radio signals, which are radio signals of the first radio signal type, and the one or more second radio signals, which are radio signals of the second radio signal type may be manipulated (e.g. falsified). A possible reason for this could be for example the first radio signal type being more susceptible to spoofing attacks than the second radio signal type. As another possible reason for this, it could be very difficult for an attacker to manipulate (e.g. falsify) both the one or more first radio signals of the first radio signal type and the one or more second radio signals of the second radio signal type at the same time. For example, the one or more first radio signals may be manipulated (e.g. falsified), while the one or more second radio signals may be authentic. According to the claimed method, the first position estimate determined for the observation position of the mobile device at least partially based on the one or more first radio signal parameters of the one or more manipulated (e.g. falsified) first radio signals most likely does not match the second position estimate determined for the observation position of the mobile device at least partially based on the one or more second radio signal parameters of the one or more authentic second radio signals.

For example based on such mismatches, the disclosed method allows for identifying potentially manipulated radio signals and/or radio signal parameters at least partially based on the first and the second radio map information and, thus, to mitigate threats associated with manipulation techniques like spoofing and jamming.

According to an exemplary embodiment of the invention, at least one of the first radio signals of the first radio signal type and the second radio signals of the second radio signal type are radio signals of one of the following radio technologies:
Bluetooth radio technology;
Bluetooth Low Energy radio technology;
WLAN radio technology;
LPWAN radio technology;
cellular radio technology.

Accordingly, at least one of the first radio signals of the first radio signal type and the second radio signals of the second radio signal type are transmitted by one of the following radio devices:
a Bluetooth beacon (e.g. a Bluetooth beacon enabling Bluetooth low energy mode or a Bluetooth low energy beacon);
an access point of a WLAN;
an access point of a LPWAN; and
a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver. The Bluetooth and/or BLE radio interface may be configured to transmit Bluetooth and or BLE radio signals. A Bluetooth beacon that is employed for the invention may be any kind of Bluetooth beacon complying with any present or future standard. The Bluetooth standards are specified by the Bluetooth Special Interest Group and are presently available under www.bluetooth.com.

Such Bluetooth beacons may be easily installed as dedicated position support radio devices at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of 2 to 3 meters as well as a high reliability in floor detection may be achieved. The Bluetooth beacons may be stand-alone devices or be integrated into or attached to some other device. Bluetooth beacons, in particular in low energy mode, require comparably little energy and the use of Bluetooth low energy may enable a positioning with limited energy consumption at all involved devices.

It is to be understood, however, that other radio devices than variations of Bluetooth beacons may be used as well as dedicated position support radio devices, for instance tags or other devices that are configured to transmit ultra-wideband (UWB) signals or any wireless radio signals that might emerge in the future.

As disclosed above, existing radio devices like WLAN access points, LPWAN access points or cellular network nodes may be used as positioning support radio devices alternatively or additionally.

An LPWAN access point may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org.

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal. The 2G/3G/4G/5G cellular radio communication standards are developed by the 3GPP and presently available under www.3gpp.org.

According to an exemplary embodiment of the invention, the at least one of the first radio signal parameters and the second radio signal parameters comprise or represent one or more of the following radio signal parameters:
an identifier of a radio signal;
a received signal strength parameter;
a signal-to-noise ratio parameter;
a signal quality parameter.

An identifier of a radio signal may be understood to mean information contained in an observable radio signal which is configured to enable identifying the radio signal and/or distinguishing the radio signal from other radio signals. An example for such an identifier of a radio signal is an identifier of a radio device transmitting the radio signal like a name, an address (e.g. a MAC address or an IP address), an universally unique identifier (UUID), a service set identifier (SSID), a basic service set identifier (BSSID), or a combination thereof. For example, the identifiers of the one or more radio signals may be obtained by extracting the identifiers from the one or more radio signals when scanning for observable radio signals at the observation position.

A signal quality parameter may be understood to mean information indicating the reception quality of an observable radio signal. Examples of such signal quality parameters are a received signal strength parameter and a signal-to-noise ratio parameter.

A received signal strength parameter may represent the receiving power of an observed radio signal. In other words, the received signal strength parameter may represent the receiving power of a radio signal observed by the mobile device when scanning for observable radio signals. For example, the mobile device may measure the receiving power of a radio signal observed by the mobile device when scanning for observable radio signals. An example, of a received signal strength parameter is a received signal strength indicator (RSSI) or a physical receiving power level (e.g. a Rx power level) in dBm.

A signal-to-noise ratio parameter may represent a ratio of the receiving power of an observed radio signal and the receiving power of observed background noise. For example, when scanning for observable radio signals, the mobile device may measure the receiving power of a radio signal observed by the mobile device and the receiving power of the background noise observed by the mobile device. An example, of a signal-to-noise ratio parameter is a value representing the ratio of the receiving power of an observed radio signal and the receiving power of observed background noise in dB.

According to an exemplary embodiment of the invention, the first radio map represents, for each radio device of a first plurality of radio devices, a respective radio model (e.g. for radio signals of the first radio signal type), and wherein the second radio map represents, for each radio device of a second plurality of radio devices, a respective radio model (e.g. for radio signals of the second radio signal type).

For example, the first plurality of radio devices only comprises radio devices transmitting radio signals of the first radio signal type and the second plurality of radio devices only comprises radio devices transmitting radio signals of the second radio signal type.

A radio model may represent an estimate of a two-dimensional or a three-dimensional coverage map. It may describe (e.g. define) the expected radio coverage (e.g. an expected coverage area) of a radio device within which one or more radio signal parameters indicative of one or more radio signals transmitted by the radio device are expected to be observable. The real radio coverage of the radio device may however deviate from such an expected radio coverage. A radio signal may be understood to be observable at a specific position and/or in a specific area if the radio signal is receivable with a minimum quality (e.g. a minimum signal-to-noise ratio and/or a minimum signal power) at this specific position and/or within this specific area.

A radio model may be a hard-boundary model or a soft-boundary model.

An example for a soft-boundary radio model may be a parametric radio model. For example, such a parametric radio model may represent or comprise one or more radio transmission parameters (e.g. path-loss exponent and transmission power) characteristic for the expected propagation of one or more radio signals transmitted by a radio device. Using radio transmission parameters of the parametric radio model may have the effect that the required amount of data for defining the one or more characteristics of one or more radio signals may be particularly small. An example of a parametric radio model is a path loss model for radio signals transmitted or triggered to be transmitted by a radio device. In this case, the radio transmission parameters may comprise a path loss exponent and an indication of a transmission power used by the transmitter of the radio device. Based on the parametric radio model an expected radio coverage of a radio device may be determined.

Alternatively or additionally, a soft boundary radio model may be a radio image model representing an expected radio signal strength field of a radio signal transmitted or triggered to be transmitted by a radio device. An example of such a radio image model is a signal strength matrix model like a signal strength heatmap or a signal strength matrix.

An example for a hard-boundary radio model may be a geometric model. The radio model may be referred to as a geometric model of an expected radio coverage of a radio device if it is a geometric shape, such as for example a polygon, a rectangle and/or a square, a cuboid and/or a cube, an ellipse and/or a circle or an ellipsoid and/or a sphere.

Using such geometric models representing the expected radio coverage of respective radio devices within the predetermined environment of the radio map has the effect that the radio model is very simple, only requires a small amount of data and is easy to analyze.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
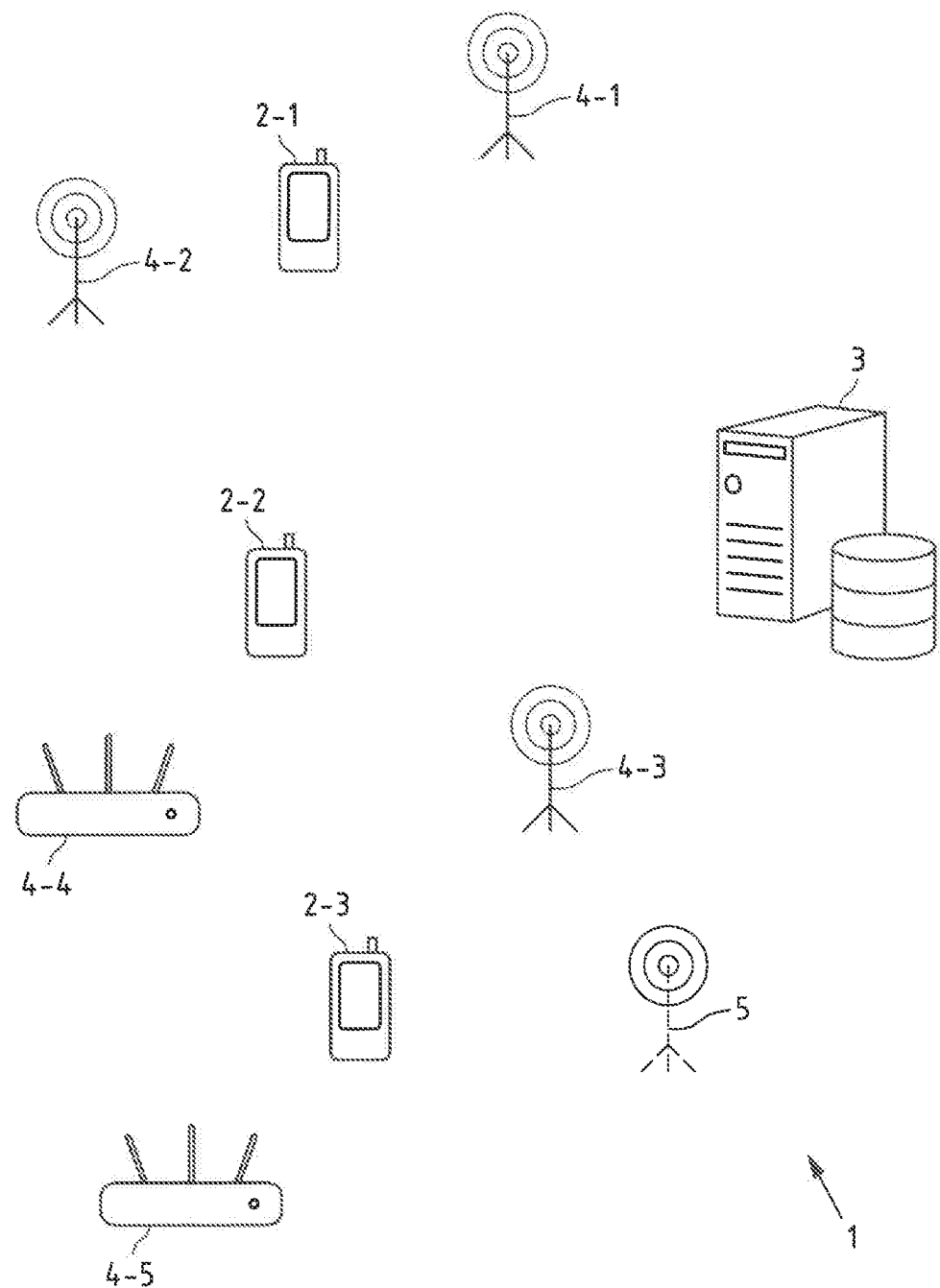
FIG. 1 is a block diagram of an exemplary embodiment of a system according to the invention.

FIG. 1 is a schematic high-level block diagram of a system 1 according to an exemplary aspect of the invention. For exemplary purposes and without limiting the scope of the invention, it is assumed in the following unless otherwise stated that system 1 is a non-GNSS based radio positioning system for a predetermined environment like a building or a complex of buildings (e.g. a shopping center, a parking garage, an airport, a company site, etc.).

For example, each of mobile devices 2-1 to 2-3 may be one of a smartphone, a tablet computer, a notebook computer, a smart watch and a smart band.

Mobile devices 2-1 to 2-3 may be enabled for or support non-GNSS based radio positioning system 1.

System 1 comprises a positioning server 3 and a plurality of optional radio devices 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio devices 4-1 to 4-3 are radio devices in the form of BLE beacons 4-1 to 4-3. It is further assumed that radio devices 4-4 and 4-5 are radio devices in the form of WLAN access points 4-4 and 4-5. In the following, it is thus referred to BLE beacons 4-1 to 4-3 and to WLAN access points 4-4 and 4-5 without limiting the scope of the invention. The radio devices 4-1 to 4-5 are fixedly installed at their respective positions in the predetermined environment of system 1 and may be configured to automatically and repeatedly transmit a radio signal like an advertisement signal. In the scope of this example, the BLE radio signals transmitted by radio devices 4-1 to 4-3 are radio signals of a first radio signal type, characterized by a Bluetooth Low Energy radio technology as underlying radio technology and the WLAN radio signals transmitted by the radio devices 4-4 and 4-5 are radio signals of a second radio signal type, characterized by a WLAN radio technology as underlying radio technology. The BLE radio signals transmitted by radio devices 4-1 to 4-3 and the WLAN radio signals transmitted by the radio devices 4-4 and 4-5 may contain and/or represent respective positioning support information which are configured to enable mobile devices 2-1 to 2-3 to estimate their position at least partially based on this positioning support information. An example of such positioning support information is an identifier like an UUID of the respective one of BLE beacons 4-1 to 4-3 or an BSSID of the respective one of WLAN access points 4-4 and 4-5 transmitting the respective radio signal containing this positioning support information.

In the training stage of system 1, mobile devices like mobile devices 2-1 to 2-3 may collect radio fingerprint observation reports indicating an observation position within the predetermined environment of system 1 and the UUIDs contained in or represented by the BLE radio signals transmitted by BLE beacons 4-1 to 4-3 and the BSSIDs contained in or represented by the WLAN radio signals transmitted by WLAN access points 4-4 and 4-5 observable at the observation position. The collected radio fingerprint observation reports may be provided (e.g. transmitted) by the mobile devices to positioning server 3 for determining a first and a second radio map.

For example, the first radio map may be configured to enable mobile devices 2-1 to 2-3 to estimate their position at least partially based on this first radio map when the mobile devices 2-1 to 2-3 are located within the predetermined environment of the first radio map (i.e. the area covered by the first radio map and in which the BLE radio signals transmitted by BLE beacons 4-1 to 4-3 are observable). Moreover, the first radio map is indicative of an expected radio environment at a certain position within the predetermined environment of the first radio map, at which position this expected radio environment is indicative of one or more BLE radio signals that are expected to be observable (e.g. obtainable as scanning results).

For example, the second radio map may be configured to enable mobile devices 2-1 to 2-3 to estimate their position at least partially based on this second radio map when the mobile devices 2-1 to 2-3 are located within the predetermined environment of the second radio map (i.e. the area covered by the second radio map and in which the WLAN radio signals transmitted by WLAN access points 4-4 and 4-5 are observable). Moreover, the second radio map is indicative of an expected radio environment at a certain position within the predetermined environment of the second radio map, at which position this expected radio environment is indicative of one or more WLAN radio signals that are expected to be observable (e.g. obtainable as scanning results).

For example, the first radio map may represent, for each position of a predetermined grid of positions within the predetermined environment of the first radio map, one or more respective BLE radio signals or one or more respective BLE radio signal parameters of one or more BLE radio signals that are expected to be observable (e.g. obtainable as scanning results by a mobile device like one of mobile devices 2-1 to 2-3) at the respective position. To this end, the first radio map may contain or represent a respective radio model for each of BLE beacons 4-1 to 4-3. The second radio map may represent, for each position of a predetermined grid of positions within the predetermined environment of the second radio map, one or more respective WLAN radio signals or one or more respective WLAN radio signal parameters of one or more WLAN radio signals that are expected to be observable (e.g. obtainable as scanning results by a mobile device like one of mobile devices 2-1 to 2-3) at the respective position. To this end, the second radio map may contain or represent a respective radio model for each of WLAN access points 4-4 and 4-5.

As disclosed above, a respective radio model for a respective one of radio devices 4-1 to 4-5 may be understood to represent at least the expected radio coverage of the respective radio device. For example, the radio model may at least describe the coverage area within which radio signals transmitted by this radio device and, thus, containing or representing an identifier like a UUID or an BSSID of this radio device are expected to be observable. Alternatively or additionally, the radio model may additionally represent, for each position of a predetermined grid of positions which is within the coverage area of the radio devices, the respective received signal strength of radio signals transmitted by this radio device that is expected to be observed (e.g. obtainable as scanning results) by a mobile device (e.g. one of mobile devices 2-1 to 2-3) when scanning for observable radio signals at the respective position of the plurality of positions.

Without limiting the scope of the invention, it is assumed in the following that the predetermined environment of the first radio map is equal to the predetermined environment of the second radio map, which is equal to the predetermined environment of system 1. Furthermore, it is assumed that the predetermined grid of positions within the predetermined environment of the first radio map is equal to the predetermined grid of positions within the predetermined environment of the second radio map, which is equal to the predetermined grid of positions within the predetermined environment of the system 1. These assumptions imply that the first radio map represents, for each position of the predetermined grid of positions within the predetermined environment of system 1, the UUID(s) contained in or represented by and the received signal strength value(s) of the one or more respective BLE radio signals that are expected to be observable (e.g. obtainable as scanning results by a mobile device like one of mobile devices 2-1 to 2-3) at the respective position. Likewise, it is assumed that the second radio map represents, for each position of the predetermined grid of positions within the predetermined environment of system 1, the BSSID(s) contained in or represented by and the received signal strength value(s) of the one or more respective WLAN radio signals that are expected to be observable (e.g. obtainable as scanning results by a mobile device like one of mobile devices 2-1 to 2-3) at the respective position.

In the positioning stage, mobile devices 2-1 to 2-3 may use the first radio map and the second radio map to determine their position at least partially based on BLE radio signal parameters of observable BLE radio signals and WLAN radio signal parameters of observable WLAN radio signals. For example, if mobile device 2-1 obtains BLE radio signal parameters (e.g. UUIDs, received signal strength value/indicator, etc.) of three BLE radio signals transmitted by BLE beacons 4-1, 4-2 and 4-3 when scanning for observable radio signals at its present observation position, it may for example be estimated by use of the first radio map that its present observation position is within the overlapping region of the coverage areas described by the radio models of BLE beacons 4-1, 4-2 and 4-3. As another example, if mobile device 2-3 obtains WLAN radio signal parameters (e.g. BSSIDs, received signal strength value/indicator, etc.) of two WLAN radio signals transmitted by WLAN access points 4-4 and 4-5 when scanning for observable radio signals at its present observation position, it may for example be estimated by use of the second radio map that its present observation position is within the overlapping region of the coverage areas described by the radio models of WLAN access points 4-4 and 4-5.

As disclosed above, non GNSS-based radio positioning systems like system 1 may be affected by manipulating radio signals that are used for positioning purposes during the positioning stage. Manipulation techniques may for example be spoofing or jamming of such radio signals as disclosed above in more detail. For example, an attacker may install a spoofing radio device 5 in a certain area to deceive mobile devices 2-1 to 2-3 to cause them to determine to be located within the overlapping region of the coverage areas described by the radio models of BLE beacons 4-1, 4-2 and 4-3. The spoofing radio device 5 may be configured to (e.g. automatically and/or repeatedly) transmit spoofed BLE radio signals containing or representing the UUIDs of BLE beacons 4-1, 4-2 and 4-3. If mobile devices 2-1 to 2-3 determine their position at least partially based on radio signal parameters of these spoofed BLE radio signals, they may determine (e.g. estimate) their position to be within the overlapping region of the coverage areas described by the radio models of BLE beacons 4-1, 4-2 and 4-3 even though they may be located in an entirely different area.

As disclosed in more detail below with respect to FIG. 5, this threat may be mitigated by the disclosed method.

Figure 2:
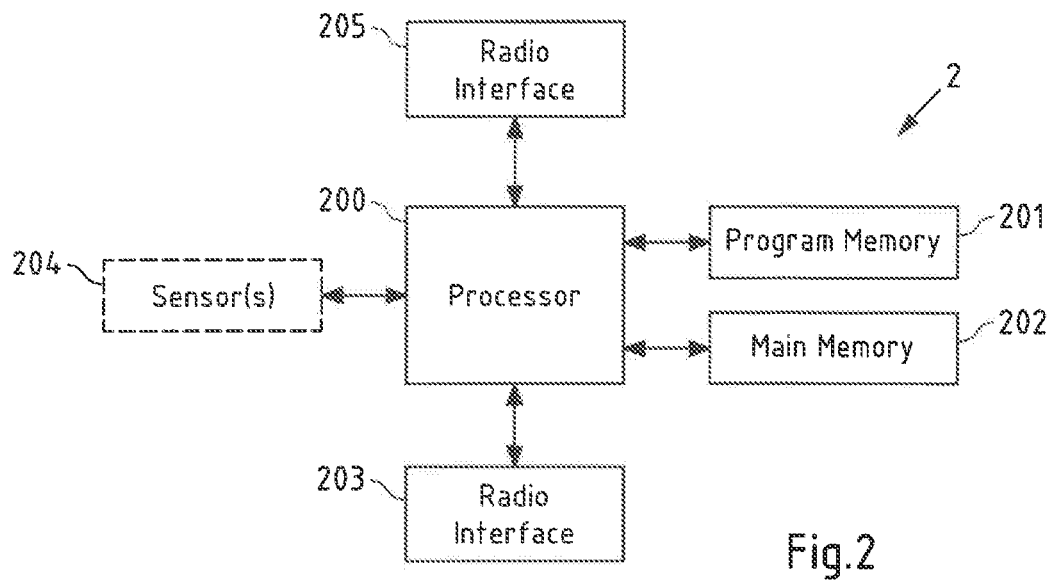
FIG. 2 is a block diagram of an exemplary embodiment of a mobile device according to the invention.

FIG. 2 is a block diagram of an exemplary embodiment of mobile device 2 according to the invention. In the following, it is assumed that mobile devices 2-1 to 2-3 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 5), when executed on processor 200), and interfaces with a main memory 202. Program memory 201 may also contain an operating system for processor 200 and radio map information representing a radio map of the predetermined environment of system 1. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a radio interfaces 203 and 205 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 203 is a BLE transceiver configured to transmit and receive BLE radio signals in line with any current or future version of the Bluetooth standard supporting a low energy mode. Radio interface 203 enables mobile device 2 to scan for observable BLE radio signals transmitted (e.g. broadcasted) by BLE beacons 4-1 to 4-3 of system 1. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 200, to determine one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 200 as scanning results. It is to be understood that any computer program code required for receiving and processing received BLE radio signals may be stored in an own memory of the radio interface 203 and executed by an own processor of the radio interface 203 or it may be stored for example in memory 202 and executed for example by processor 200.

It is further assumed in the following for exemplary purposes that radio interface 205 is a WLAN transceiver configured to transmit and receive WLAN radio signals in line with any current or future version of the WLAN standards of the IEEE 802.11 family. Radio interface 205 enables mobile device 2 to scan for observable WLAN radio signals transmitted (e.g. broadcasted) by WLAN access points 4-4 and 4-5 of system 1. Therein, a WLAN radio signal may be understood to be observable if the WLAN radio signal is receivable with a minimum quality (e.g. a minimum signal-to-noise ratio and/or a minimum signal power, e.g. at least −90 dBm or −95 dBm). Moreover, the WLAN transceiver is configured, alone or together with processor 200, to determine one or more radio signal parameters of WLAN radio signals observed (e.g. received) when scanning for observable radio signals. To this end, the WLAN transceiver may for example extract, from each observed WLAN radio signal, the respective BSSID contained therein and measure the respective received signal strength of each observed WLAN radio signal. The extracted BSSIDs and the received signal strength values may then for example be provided to processor 200 as scanning results. It is to be understood that any computer program code required for receiving and processing received WLAN radio signals may be stored in an own memory of the radio interface 205 and executed by an own processor of the radio interface 205 or it may be stored for example in memory 202 and executed for example by processor 200.

Moreover, processor 200 controls one or more optional sensors 204. Examples of sensors 204 are a GNSS sensor (e.g. a GPS sensor and/or a Galileo sensor), an inertial or motion sensor (e.g. a speed sensor, an acceleration sensor, a shock sensor, an activity or step sensor, an orientation sensor like a compass or a gyroscope), an optical sensor (e.g. a camera), or a combination thereof. The determined sensor information may be provided to processor 200. For example, sensor information can be given in form of observation position information representing or comprising GNSS coordinates representing the observation position determined by the GNSS sensor of the mobile device. Additionally or alternatively, sensor information can be given in form of sensor information indicating (e.g. qualitatively or quantitatively) a movement of the mobile device.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
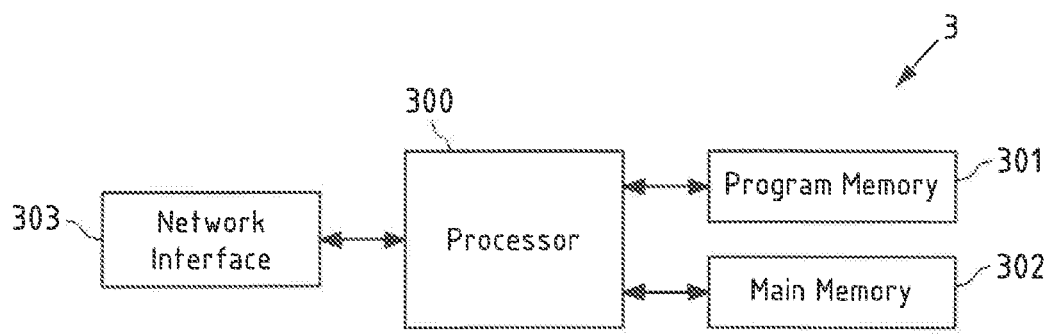
FIG. 3 is a block diagram of an exemplary embodiment of a positioning server according to the invention.

FIG. 3 is a block diagram of an exemplary embodiment of positioning server 3 according to the invention. In the following, it is assumed that positioning server 3 of system 1 of FIG. 1 corresponds to this positioning server 3.

Positioning server 3 comprises a processor 300. Processor 300 may represent a single processor or two or more processors, which are for instance at least partially coupled, for instance via a bus. Processor 300 executes a computer program code stored (e.g. computer program code causing positioning server 3 to determine a first radio map and a second radio map of the predetermined environment of system 1 based on radio fingerprint observation reports collected by mobile devices like mobile devices 2-1 to 2-3) in program memory 301, and interfaces with a main memory 302. Program memory 301 may also contain an operating system for processor 300, first radio map information representing a first radio map of the predetermined environment of system 1 and second radio map information representing a second radio map of the predetermined environment of system 1. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a network interface 303 which is configured to communicate via a communication network (e.g. the internet). Positioning server 3 may use network interface 303 to communicate with mobile devices 2-1 to 2-3 of FIG. 1 (e.g. via the internet). For example, positioning server 3 may use network interface 303 to receive radio fingerprint observation reports from mobile devices 2-1 to 2-3 and/or transmit radio map information to mobile devices 2-1 to 2-3.

The components 301 to 303 of positioning server 3 may for example be connected with processor 300 by means of one or more serial and/or parallel busses.

It is to be understood that positioning server 3 may comprise various other components like a user interface for receiving user input.

Figure 4:
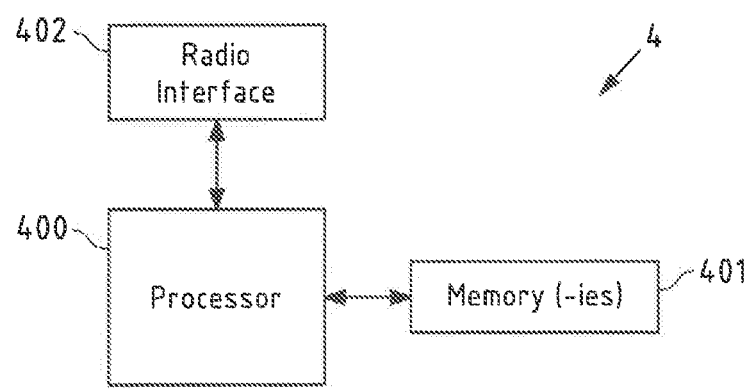
FIG. 4 is a block diagram of an exemplary embodiment of a radio device according to the invention.

FIG. 4 is a block diagram of an exemplary embodiment of a radio device 4 according to the invention. Radio device 4 comprises a processor 400, which may represent a single processor or two or more processors, which are for instance at least partially coupled, for instance via a bus. Processor 400 executes a program code stored in memory(-ies) 401. Memory(-ies) 401 may also comprise an operating system for processor 400. Memory(-ies) 401 may for instance comprise a first memory portion that is fixedly installed in radio device 4, and a second memory portion that is removable from radio device 4, for instance in the form of a removable SD memory card. Some or all of memory(ies) 401 may also be included into processor 400. Memory(ies) 401 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 400 when executing an operating system and/or computer program code.

Processor 400 further controls a radio interface 402 configured to receive and/or transmit radio signals. Radio interface 402 may at least comprise a radio transmitter and may additionally comprise a radio receiver. The transmitter and receiver may also be part of a radio transceiver. For example, the radio transmitter may be configured to automatically and repeatedly transmit radio signals. As disclosed above in more detail, such radio signals may contain and/or represent positioning support information (e.g. a UUID or BSSID of radio device 4).

For example, if radio device 4 is a BLE beacon and corresponds to BLE beacons 4-1 to 4-3 of system 1, the radio interface 402 of BLE beacon 4 may at least comprise a BLE transmitter and may additionally comprise a BLE receiver. The BLE transmitter and BLE receiver may also be part of a BLE transceiver. The BLE transmitter enables BLE beacon 4 to transmit BLE radio signals in line with any current or future version of the Bluetooth standard supporting a low energy mode. Likewise, the BLE receiver enables BLE beacon 4 to receive BLE radio signals in line with any current or future version of the Bluetooth standard supporting a low energy mode.

For example, if radio device 4 is a WLAN access point and corresponds to WLAN access points 4-4 and 4-5 of system 1, the radio interface 402 of WLAN access point 4 may at least comprise a WLAN transmitter and may additionally comprise a WLAN receiver. The WLAN transmitter and WLAN receiver may also be part of a WLAN transceiver. The WLAN transmitter enables WLAN access point 4 to transmit WLAN radio signals in line with any current or future version of the WLAN standards of the IEEE 802.11 family. Likewise, the WLAN receiver enables WLAN access points 4 to receive WLAN radio signals in line with any current or future version of the WLAN standards of the IEEE 802.11 family.

In another example, the radio interface 402 may comprise a first radio transmitter and may additionally comprise a first radio receiver, and it further may comprise a second radio transmitter and may additionally comprise a second radio receiver. The first transmitter and first receiver may also be part of a first radio transceiver and the second transmitter and second receiver may also be part of a second radio transceiver. For example, the first radio transmitter may be configured to automatically and repeatedly transmit first radio signals of a first radio signal type and the second radio transmitter may be configured to automatically and repeatedly transmit second radio signals of a second radio signal type. As disclosed above in more detail, such first radio signals and second radio signals may contain and/or represent respective positioning support information (e.g. a UUID or BSSID of radio device 4).

For example, if radio device 4 is a WLAN access point and corresponds to WLAN access points 4-4 and 4-5 of system 1, the radio interface 402 of WLAN access point 4 may comprise a first WLAN transmitter and may additionally comprise a first WLAN receiver. Additionally, the radio interface 402 of WLAN access point 4 may comprise a second WLAN transmitter and may additionally comprise a second WLAN receiver. The first WLAN transmitter and first WLAN receiver may also be part of a first WLAN transceiver and the second WLAN transmitter and the second WLAN receiver may also be part of a second WLAN transceiver. The first WLAN transmitter enables WLAN access point 4 to transmit first WLAN radio signals of a first radio signal type in line with any current or future version of the WLAN standards of the IEEE 802.11 family. Likewise, the WLAN receiver enables WLAN access points 4 to receive second WLAN radio signals of a second radio signal type in line with any current or future version of the WLAN standards of the IEEE 802.11 family. For example, the first WLAN radio signals may be WLAN radio signals transmitted at a frequency included in the 2.4 GHz frequency band and the second WLAN radio signals may be WLAN radio signals transmitted at a frequency included in the 5 GHz frequency band.

The components 401 to 402 of radio device 4 may for example be connected with processor 400 by means of one or more serial and/or parallel busses.

It is to be understood that radio device 4 may comprise various other components.

Figure 5:
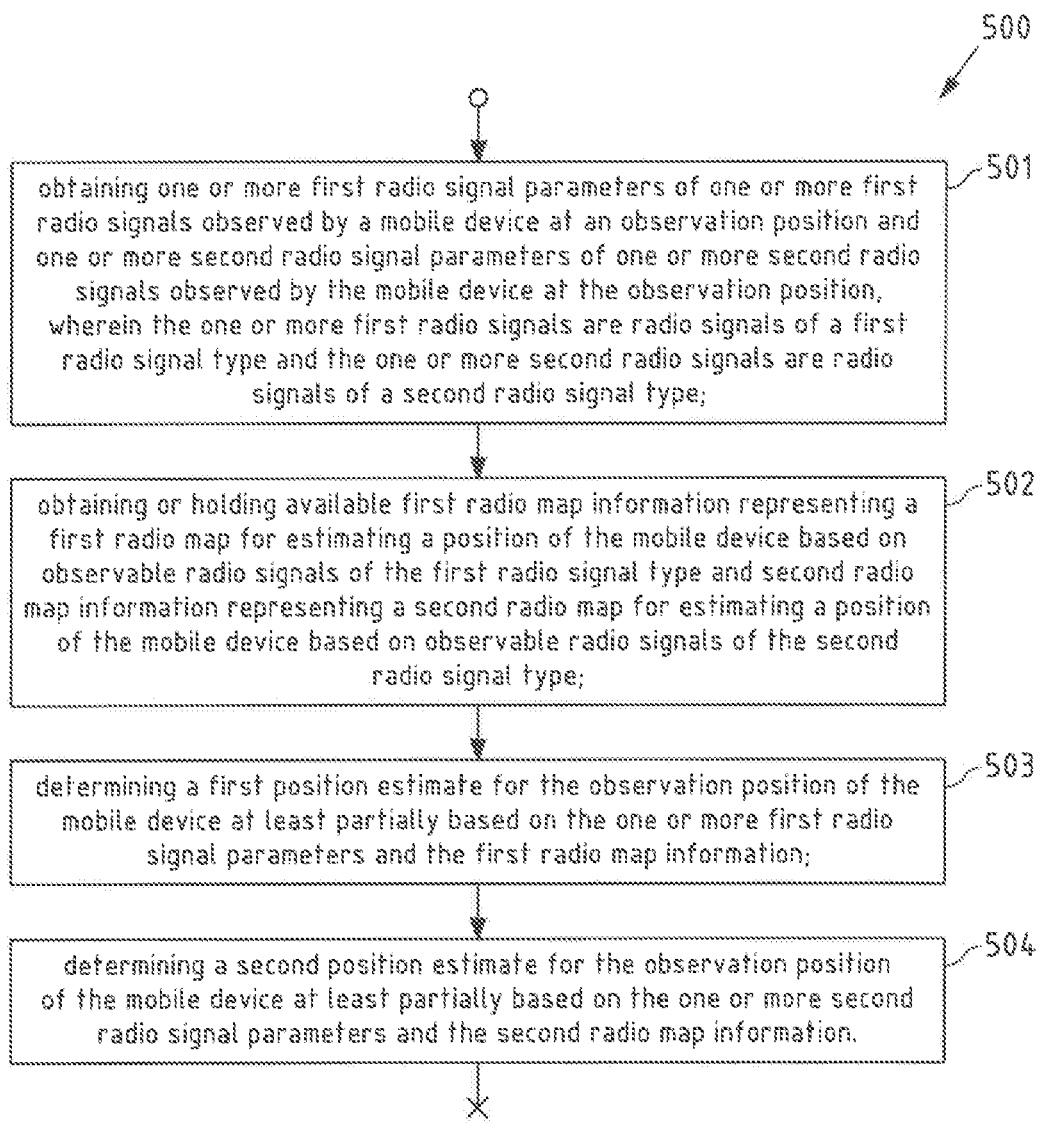
FIG. 5 is a flow chart illustrating an exemplary embodiment of a method according to the invention.

FIG. 5 is a flow chart 500 illustrating an exemplary embodiment of a method according to the invention. For exemplary purposes and without limiting the scope of the invention, it is assumed in the following that mobile device 2-3 as described above with respect to FIG. 1 performs the steps of flow chart 500.

In a step 501, one or more first radio signal parameters of one or more first radio signals and one or more second radio signal parameters of one or more second radio signals observed by mobile device 2-3 at an observation position are obtained by mobile device 2-3, wherein the one or more first radio signals are radio signals of a first radio signal type and the one or more second radio signals are radio signals of a second radio signal type.

As disclosed above in more detail, the one or more first radio signal parameters and the one or more second radio signal parameters may be obtained as scanning results when scanning for observable radio signals at the observation position of mobile device 2-3 in step 501. In the following, it is assumed that the one or more first radio signals are transmitted by BLE beacons 4-1 to 4-3 and the one or more second radio signals are transmitted by WLAN access points 4-4 and 4-5. Accordingly, the one or more first radio signals are referred to as BLE radio signals and the one or more second radio signals are referred to as WLAN radio signals in the following. It is further assumed that the one or more first radio signal parameters are one or more BLE radio signal parameters representing, for each observed radio signal, a respective UUID and a respective received signal strength value and that the one or more second radio signal parameters are one or more WLAN radio signal parameters representing, for each observed radio signal, a respective BSSID and a respective received signal strength value.

In a step 502, first radio map information representing a first radio map of the predetermined environment of system 1 are obtained or held available by mobile device 2-3 and second radio map information representing a second radio map of the predetermined environment of system 1 are obtained or held available by mobile device 2-3. As disclosed above in more detail, the first radio map allows for estimating a position of mobile device 2-3 based on observable BLE radio signals transmitted by BLE beacons 4-1 to 4-3 and the second radio map allows for estimating a position of mobile device 2-3 based on observable WLAN radio signals transmitted by WLAN access points 4-4 and 4-5. Accordingly, in the following the first radio map is referred to as BLE radio map, which is represented by BLE radio map information, and the second radio map is referred to as WLAN radio map, which is represented as WLAN radio map information.

As disclosed above, the BLE radio map and the WLAN radio map of the predetermined environment of system 1 may be represented by respective BLE radio map information and WLAN radio map information which may be provided (e.g. transmitted) by positioning server 3 to mobile device 2-3 and/or which may be held available by mobile device 2-3. For example, the BLE radio map information and WLAN radio map information may be received from positioning server 3 in step 502 and subsequently stored in memory 201.

In a step 503, a first position estimate for the observation position of the mobile device 2-3 is determined at least partially based on the BLE radio signal parameters and the BLE radio map information representing the BLE radio map.

For example, determining the first position estimate for the observation position of the mobile device 2-3 may be performed according to a predetermined algorithm (e.g. a positioning algorithm). As disclosed above, a radio map of a predetermined environment may represent, for each position of a predetermined grid of positions within the predetermined environment, the UUID(s) contained in or represented by and the received signal strength value(s) of the one or more respective radio signals that are expected to be observable (e.g. obtainable as scanning results by a mobile device like one of mobile devices 2-1 to 2-3) at the respective position. Accordingly, the predetermined algorithm (e.g. a positioning algorithm) for determining the first position estimate for the observation position of the mobile device 2-3 may for example comprise the step of determining whether the UUID(s) and the received signal strength value(s) represented by the one or more BLE radio signal parameters obtained by the mobile device 2-3 in step 501 match the respective UUID(s) and respective received signal strength value(s) represented by the BLE radio map, which is represented by the BLE radio map information obtained or held available by the mobile device 2-3 in step 502, at a position of the predetermined environment of system 1 (e.g. a position of a predetermined grid of positions within the predetermined environment of system 1). If it is determined that the UUID(s) and the received signal strength value(s) represented by the one or more BLE radio signal parameters obtained by the mobile device 2-3 in step 501 match the respective UUID(s) and respective received signal strength value(s) represented by the BLE radio map in a certain position, this position may be considered as the first position estimate in step 503.

In a step 504, a second position estimate for the observation position of the mobile device 2-3 is determined at least partially based on the WLAN radio signal parameters and the WLAN radio map information representing the WLAN radio map.

Similar to step 503, for example, determining the second position estimate for the observation position of the mobile device 2-3 may be performed according to a predetermined algorithm (e.g. a positioning algorithm), which may for example comprise the step of determining whether the BSSID(s) and the received signal strength value(s) represented by the one or more WLAN radio signal parameters obtained by the mobile device 2-3 in step 501 match the respective BSSID(s) and respective received signal strength value(s) represented by the WLAN radio map, which is represented by the WLAN radio map information obtained or held available by the mobile device 2-3 in step 502, at a position of the predetermined environment of system 1 (e.g. a position of a predetermined grid of positions within the predetermined environment of system 1). If it is determined that the BSSID(s) and the received signal strength value(s) represented by the one or more WLAN radio signal parameters obtained by the mobile device 2-3 in step 501 match the respective BSSID and respective received signal strength value(s) represented by the WLAN radio map in a certain position, this position may be considered as the second position estimate in step 504.

In a non-limiting example, step 504 may be followed by determining whether the first position estimate for the observation position of the mobile device 2-3 matches the second position estimate for the observation position of the mobile device 2-3, for example by determining whether coordinates representing the first position estimate match coordinates representing the second position estimate. This determining may be performed according to a predetermined algorithm (e.g. a matching algorithm or a comparing algorithm).

For example, when considering both the BLE radio signal parameters and the WLAN radio signal parameters obtained in step 501 are authentic radio signals, it is likely that coordinates representing the first position estimate are equal, or at least substantially equal (e.g. equal within a predetermined distance to each other) to coordinates representing the second position estimate. In this scenario, the first position estimate and the second position estimate may be considered to be trustworthy.

As another example, it may be considered as disclosed above that a spoofing radio device 5 may be configured to (e.g. automatically and/or repeatedly) transmit spoofed BLE radio signals containing or representing the UUIDs of BLE beacons 4-1, 4-2 an 4-3. In this scenario, determining the first position estimate for the observation position of mobile device 2-3 in step 503 may be partially based on spoofed BLE radio signals transmitted by the spoofing radio device 5. As a result, according to the first position estimate, the observation position of the mobile device 2-3 may be estimated to be within the overlapping region of the coverage areas described by the radio models of BLE beacons 4-1 to 4-3 and not within the region close WLAN access points 4-4 and 4-5. In contrast to this, according to the second position estimate not relying on spoofed BLE radio signals, the observation position of the mobile device 2-3 may be estimated to be within the region close WLAN access points 4-4 and 4-5. Accordingly, it is highly likely that due to the spoofing device 5, the first position estimate does not match the second position estimate, wherein determining the second position estimate relies on WLAN radio signals which are not subject to the spoofing attack by means of the spoofing device 5. In this scenario, the first and the second position estimate may be considered to be potentially manipulated.

In the given example, based on the mismatch between first position estimate and second position estimate, the disclosed method allows for identifying potentially manipulated BLE radio signals and/or BLE radio signal parameters at least partially based on the BLE radio map information and the WLAN radio map information and, thus, to mitigate threats associated with manipulation techniques like spoofing and jamming.

It is to be understood that the orders of the steps of flowchart 500 is only exemplary and that the steps may also have a different order if possible. Furthermore, it is also possible that two or more steps may be performed in one step.

Figure 6:
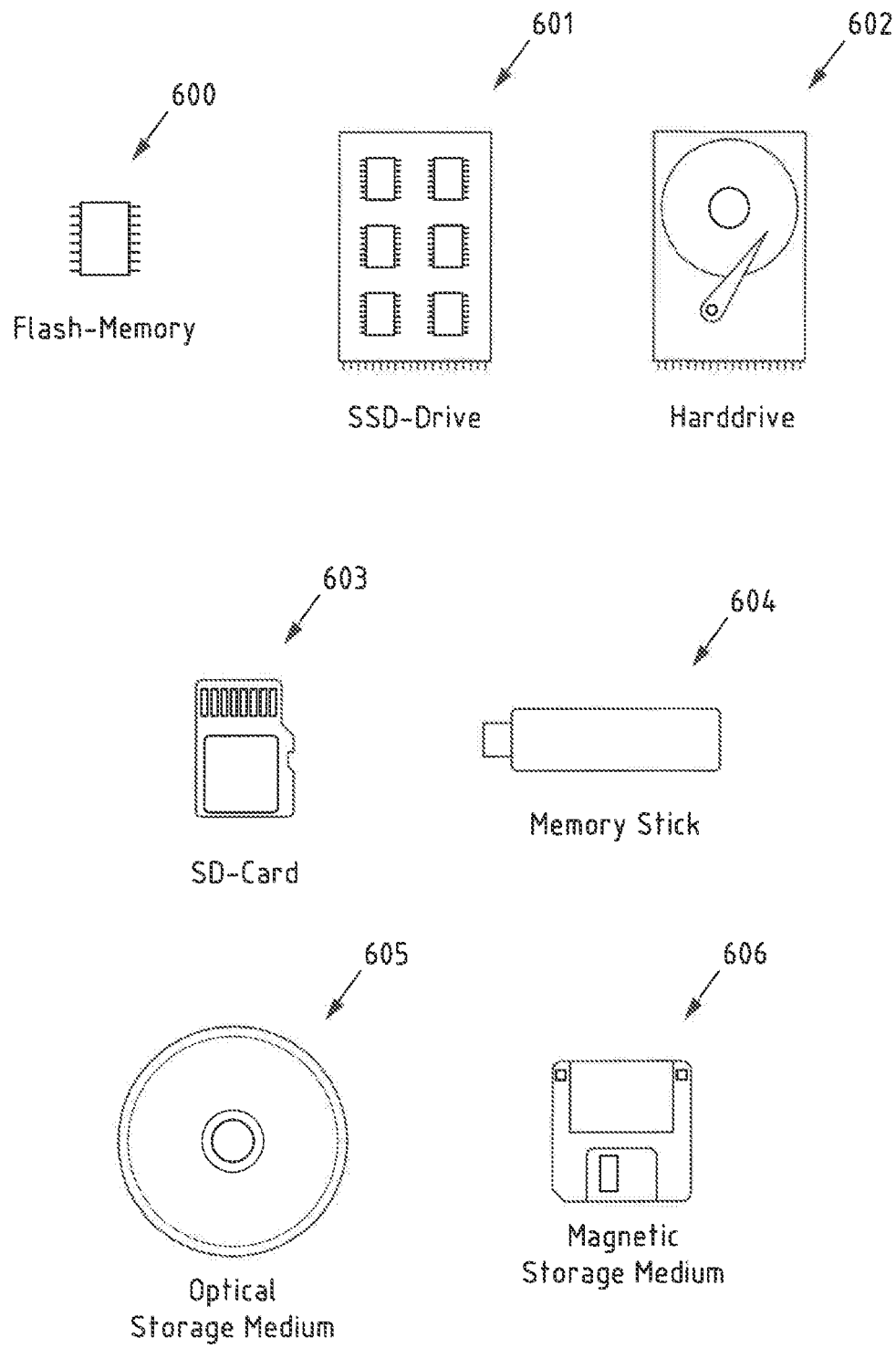
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 201 of FIG. 2, memory 301 of FIG. 3 and memory(-ies) 401 of FIG. 4. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method comprising:
obtaining one or more first radio signal parameters of one or more first radio signals observed by a mobile device at an observation position and one or more second radio signal parameters of one or more second radio signals observed by said mobile device at said observation position, wherein said one or more first radio signals are radio signals of a first radio signal type and said one or more second radio signals are radio signals of a second radio signal type;
obtaining or holding available first radio map information representing a first radio map for estimating a position of said mobile device based on observable radio signals of said first radio signal type and second radio map information representing a second radio map for estimating a position of said mobile device based on observable radio signals of said second radio signal type;
determining a first position estimate for said observation position of the mobile device at least partially based on said one or more first radio signal parameters and said first radio map information, wherein determining said first position estimate comprises determining coordinates representing said first position estimate; and
determining a second position estimate for said observation position of the mobile device at least partially based on said one or more second radio signal parameters and said second radio map information, wherein determining said second position estimate comprises determining coordinates representing said second position estimate.

2. The method according to claim 1, the method further comprising:
determining whether said first position estimate for said observation position of said mobile device matches said second position estimate for said observation position of said mobile device by determining whether a distance between said first position estimate and said second position estimate satisfies a threshold criteria.

3. The method according to claim 1, the method comprising one or more of the following, if it is determined that said first position estimate for said position of said mobile device matches said second position estimate for said position of said mobile device:
- identifying or causing of identifying at least one of said first radio map information and said second radio map information as trustworthy;
- identifying or causing of identifying at least one of said first position estimate and said second position estimate as trustworthy;
- identifying or causing of identifying at least one of said first radio signal type and said second radio signal type as trustworthy; or
- determining a qualified position estimate for the position of the mobile device at least partially based on said first position estimate and said second position estimate.

4. The method according to claim 1, the method comprising one or more of the following, if it is determined that said first position estimate for said observation position of said mobile device does not match said second position estimate for said observation position of said mobile device:
- identifying or causing of identifying at least one of said first radio map information and said second radio map information as potentially manipulated or outdated;
- identifying or causing of identifying at least one of said first position estimate and said second position estimate as potentially manipulated;
- identifying or causing of identifying at least one of said first radio signal type and said second radio signal type as potentially manipulated;
- excluding at least one of said first position estimate and said second position estimate from determining a qualified position estimate for said position of the mobile device; or
- determining whether at least one of said first position estimate and said second position estimate is potentially manipulated.

5. The method according to claim 1, wherein said first position estimate for said observation position of said mobile device contains or represents first floor level information and said second position estimate for said observation position of said mobile device contains or represents second floor level information.

6. The method according to claim 1, wherein said first radio signal type is different from said second radio signal type.

7. The method according to claim 1, wherein said one or more first radio signals of said first radio signal type and said one or more second radio signals of said second radio signal type differ at least in an underlying radio technology.

8. The method according to claim 1, wherein said one or more first radio signals of said first radio signal type and said one or more second radio signals of said second radio signal type differ at least in a frequency or frequency band.

9. The method according to claim 1, wherein at least one of said first radio signals of said first radio signal type and said second radio signals of said second radio signal type are radio signals of one of the following radio technology:
- Bluetooth radio technology;
- Bluetooth Low Energy radio technology;
- wireless local area network (WLAN) radio technology;
- low-power wide-area network (LPWAN) radio technology; or
- cellular radio technology.

10. The method according to claim 1, wherein at least one of said first radio signal parameters and said second radio signal parameters comprise or represent one or more of the following radio signal parameters:
- an identifier of a radio signal;
- a received signal strength parameter;
- a signal-to-noise ratio parameter; or
- a signal quality parameter.

11. The method according to claim 1, wherein said first radio map represents, for each radio device of a first plurality of radio devices, a respective first radio model, and wherein said second radio map represents, for each radio device of a second plurality of radio devices, a respective second radio model.

12. The method according to claim 11, wherein each of said first radio models and each of said second radio models is one of a matrix model, a geometric model and a parametric model.

13. An apparatus comprising at least one processor and at least one memory including computer program code, the at least one memory and the computer program code configured to, with the at least one processor, cause said apparatus at least to:
- obtain one or more first radio signal parameters of one or more first radio signals observed by a mobile device at an observation position and one or more second radio signal parameters of one or more second radio signals observed by said mobile device at said observation position, wherein said one or more first radio signals are radio signals of a first radio signal type and said one or more second radio signals are radio signals of a second radio signal type;
- obtain or hold available first radio map information representing a first radio map for estimating a position of said mobile device based on observable radio signals of said first radio signal type and second radio map information representing a second radio map for estimating a position of said mobile device based on observable radio signals of said second radio signal type;
- determine a first position estimate for said observation position of the mobile device at least partially based on said one or more first radio signal parameters and said first radio map information, wherein determining said first position estimate comprises determining coordinates representing said first position estimate;
- determine a second position estimate for said observation position of the mobile device at least partially based on said one or more second radio signal parameters and said second radio map information, wherein determining said second position estimate comprises determining coordinates representing said second position estimate.

14. The apparatus according to claim 13, wherein the at least one memory and the computer program code are further configured to, with the at least one processor, cause said apparatus to determine whether said first position estimate for said observation position of said mobile device matches said second position estimate for said observation position of said mobile device by determining whether a distance between said first position estimate and said second position estimate satisfies a threshold criteria.

15. The apparatus according to claim 13, wherein the at least one memory and the computer program code are further configured to, with the at least one processor, cause said apparatus, if it is determined that said first position estimate for said position of said mobile device matches said second position estimate for said position of said mobile device, to perform one or more of the following:

identifying or causing of identifying at least one of said first radio map information and said second radio map information as trustworthy;

identifying or causing of identifying at least one of said first position estimate and said second position estimate as trustworthy;

identifying or causing of identifying at least one of said first radio signal type and said second radio signal type as trustworthy; or determining a qualified position estimate for the position of the mobile device at least partially based on said first position estimate and said second position estimate.

16. The apparatus according to claim 13, wherein the at least one memory and the computer program code are further configured to, with the at least one processor, cause said apparatus, if it is determined that said first position estimate for said observation position of said mobile device does not match said second position estimate for said observation position of said mobile device, to perform one or more of the following:

identifying or causing of identifying at least one of said first radio map information and said second radio map information as potentially manipulated or outdated;

identifying or causing of identifying at least one of said first position estimate and said second position estimate as potentially manipulated;

identifying or causing of identifying at least one of said first radio signal type and said second radio signal type as potentially manipulated;

excluding at least one of said first position estimate and said second position estimate from determining a qualified position estimate for said position of the mobile device; or determining whether at least one of said first position estimate and said second position estimate is potentially manipulated.

17. The apparatus according to claim 13, wherein said first position estimate for said observation position of said mobile device contains or represents first floor level information and said second position estimate for said observation position of said mobile device contains or represents second floor level information.

18. A non-transitory computer-readable storage medium storing computer program code that is configured, upon execution, to:

obtain one or more first radio signal parameters of one or more first radio signals observed by a mobile device at an observation position and one or more second radio signal parameters of one or more second radio signals observed by said mobile device at said observation position, wherein said one or more first radio signals are radio signals of a first radio signal type and said one or more second radio signals are radio signals of a second radio signal type;

obtain or hold available first radio map information representing a first radio map for estimating a position of said mobile device based on observable radio signals of said first radio signal type and second radio map information representing a second radio map for estimating a position of said mobile device based on observable radio signals of said second radio signal type;

determine a first position estimate for said observation position of the mobile device at least partially based on said one or more first radio signal parameters and said first radio map information, wherein determining said first position estimate comprises determining coordinates representing said first position estimate; and determine a second position estimate for said observation position of the mobile device at least partially based on said one or more second radio signal parameters and said second radio map information, wherein determining said first position estimate comprises determining coordinates representing said first position estimate.

19. The computer-readable storage medium according to claim 18, wherein the computer program code is further configured, if it is determined that said first position estimate for said position of said mobile device matches said second position estimate for said position of said mobile device, to perform one or more of the following:

identifying or causing of identifying at least one of said first radio map information and said second radio map information as trustworthy;

identifying or causing of identifying at least one of said first position estimate and said second position estimate as trustworthy;

identifying or causing of identifying at least one of said first radio signal type and said second radio signal type as trustworthy; or determining a qualified position estimate for the position of the mobile device at least partially based on said first position estimate and said second position estimate.

20. The computer-readable storage medium according to claim 18, wherein the computer program code is further configured, if it is determined that said first position estimate for said observation position of said mobile device does not match said second position estimate for said observation position of said mobile device, to perform one or more of the following:

identifying or causing of identifying at least one of said first radio map information and said second radio map information as potentially manipulated or outdated;

identifying or causing of identifying at least one of said first position estimate and said second position estimate as potentially manipulated;

identifying or causing of identifying at least one of said first radio signal type and said second radio signal type as potentially manipulated;

excluding at least one of said first position estimate and said second position estimate from determining a qualified position estimate for said position of the mobile device; or determining whether at least one of said first position estimate and said second position estimate is potentially manipulated.

* * * * *